Sept. 19, 1950    J. C. JOHNSON ET AL    2,522,577
APPARATUS FOR ASSEMBLING SEALING
PADS IN RECEPTACLE CLOSURE CAPS Filed Nov. 20, 1947    7 Sheets-Sheet 6

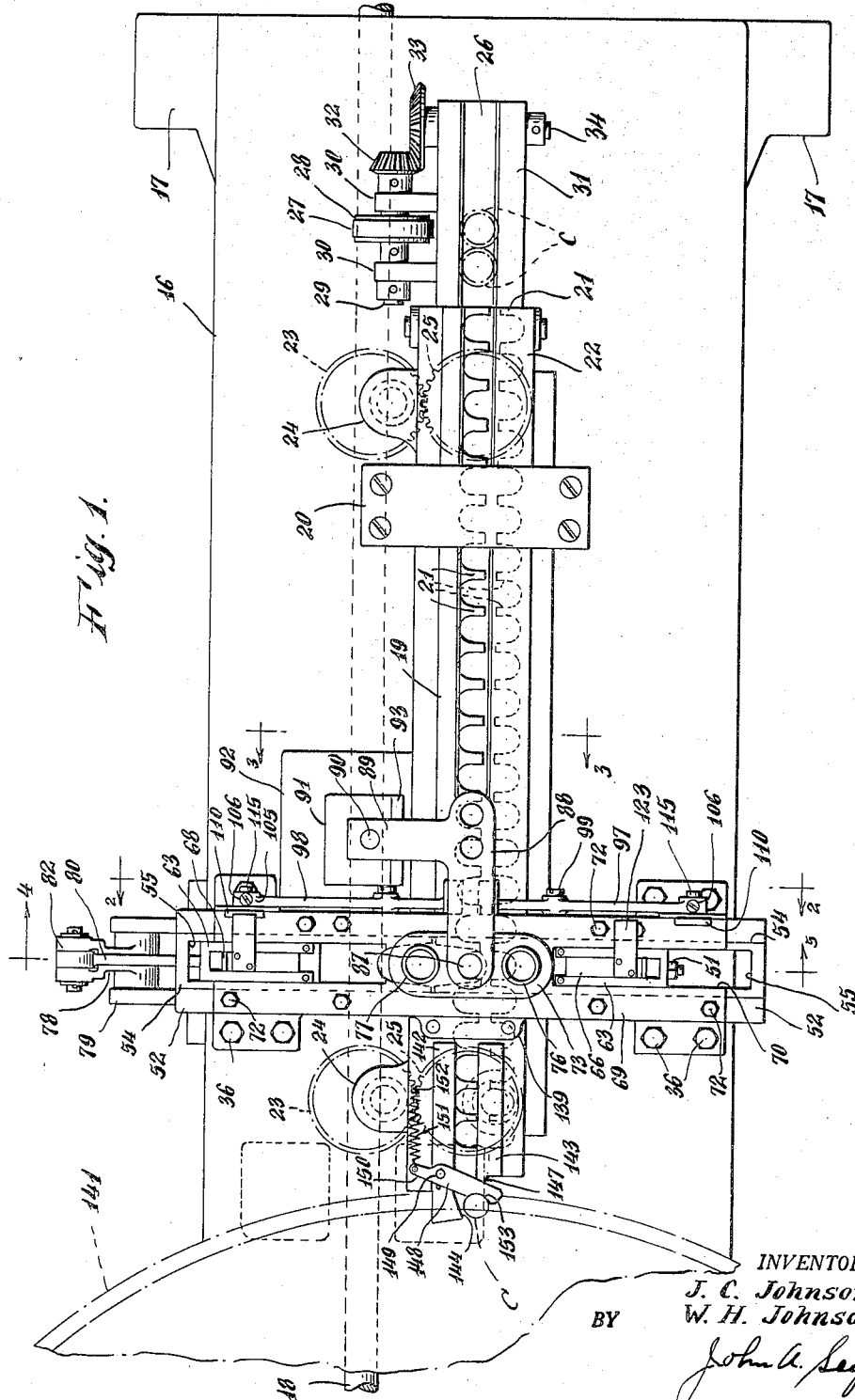

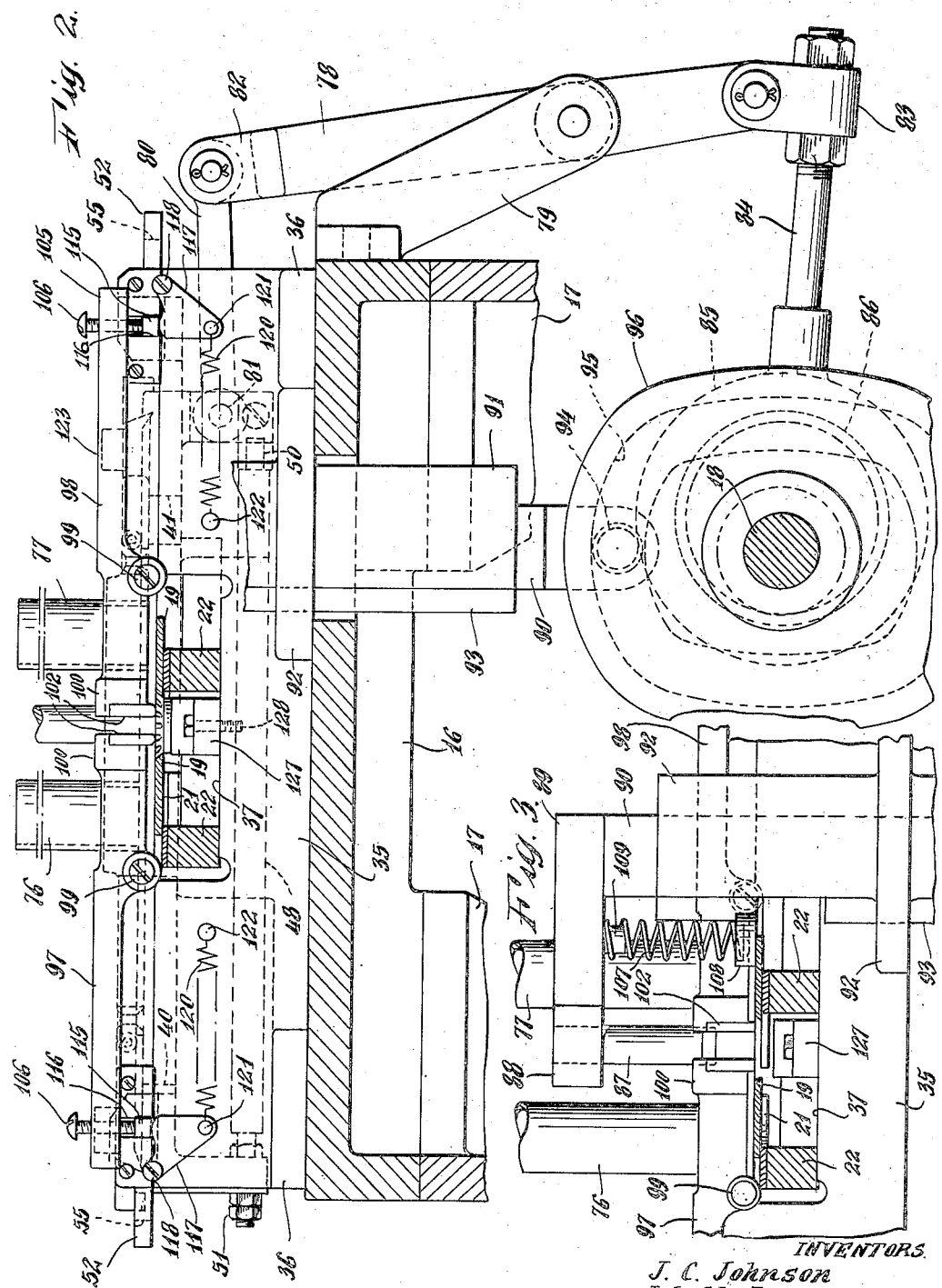

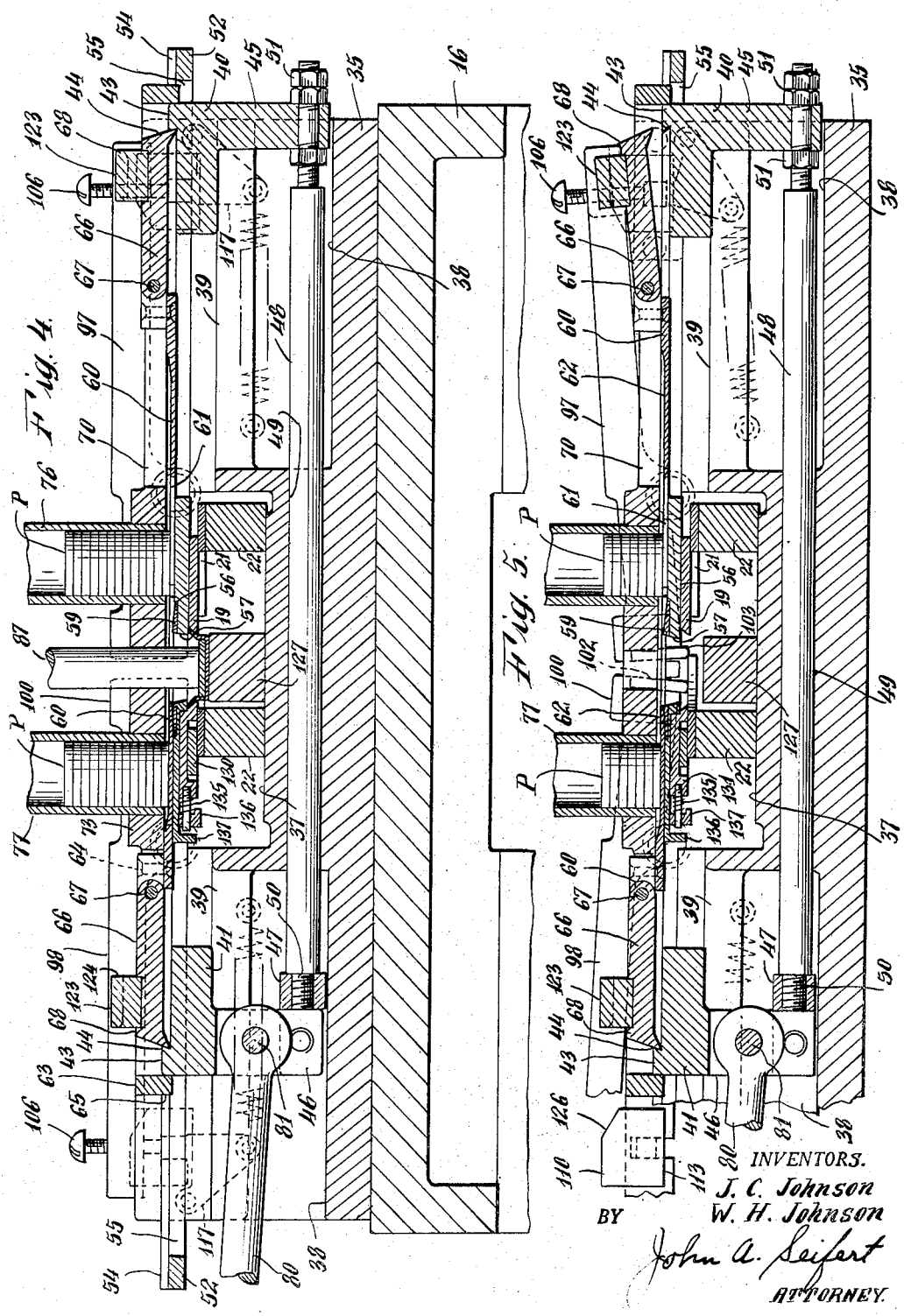

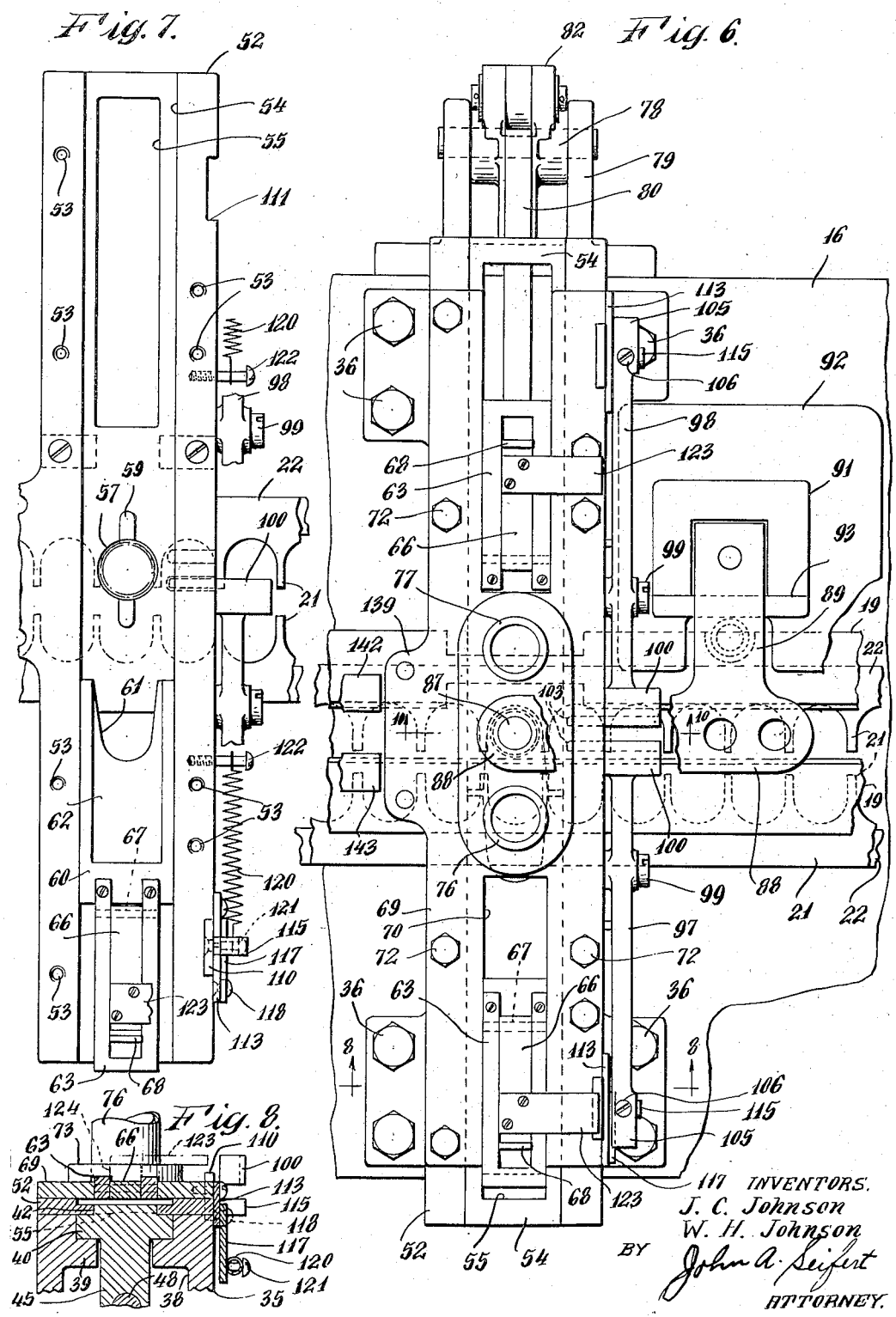

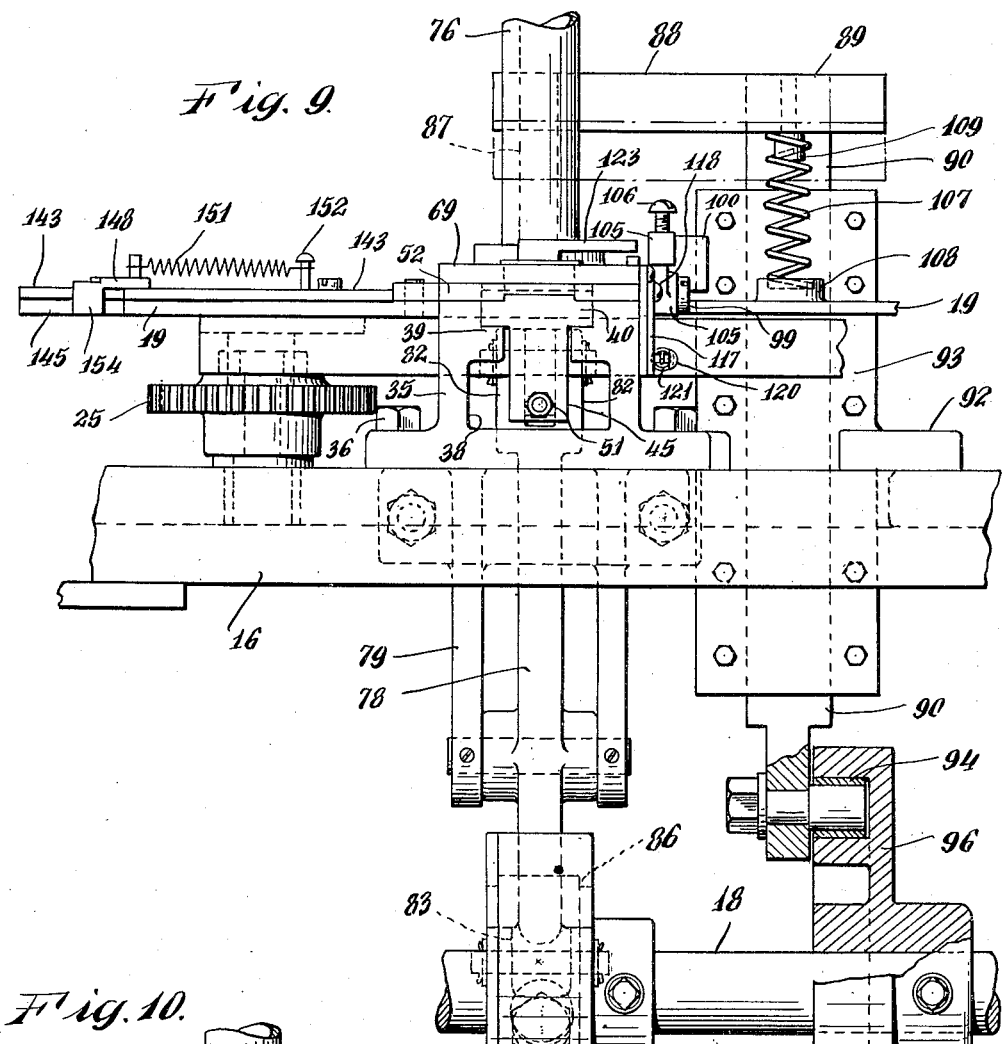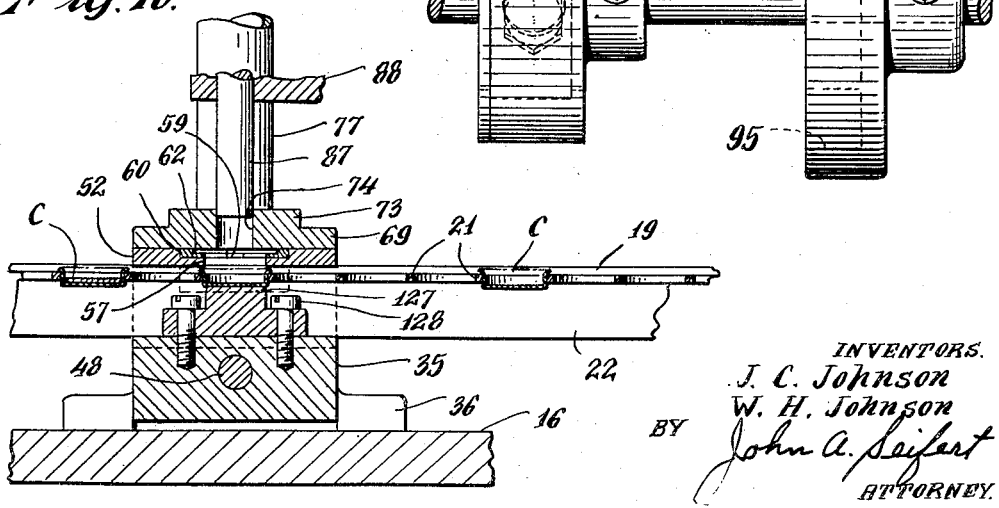

INVENTORS.
J. C. Johnson
W. H. Johnson
BY John A. Seifert
ATTORNEY.

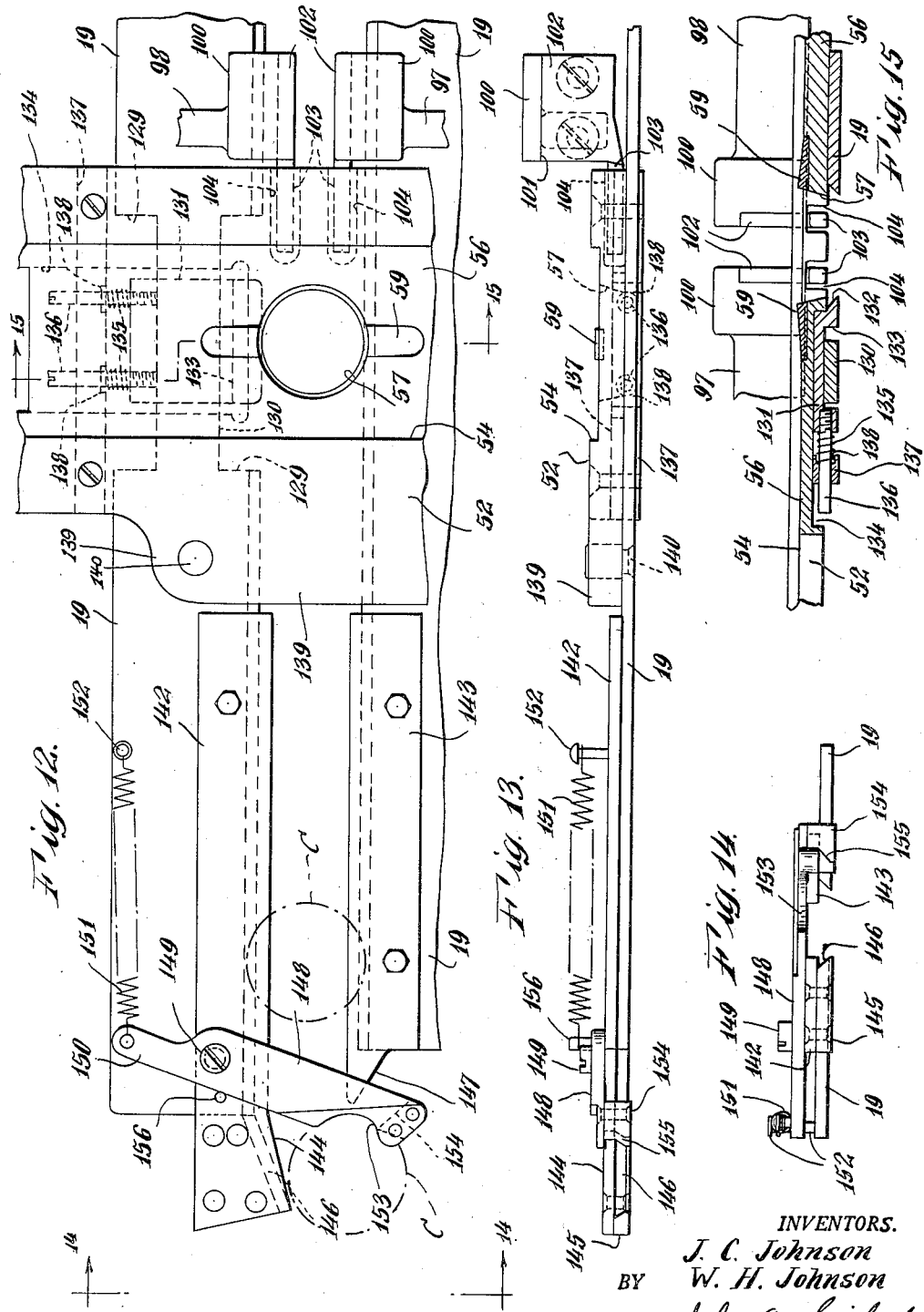

Patented Sept. 19, 1950

2,522,577

UNITED STATES PATENT OFFICE 2,522,577

APPARATUS FOR ASSEMBLING SEALING PADS IN RECEPTACLE CLOSURE CAPS

John C. Johnson, East Hempstead, N. Y., and Walter H. Johnson, Newmanstown, Pa.

Application November 20, 1947, Serial No. 787,238

10 Claims. (Cl. 154—1.5)

1

This invention relates to apparatus for assembling sealing pads in closure caps of the type commonly termed "crowns" having a flaring marginal portion of the flange arranged with corrugations or ruffles, and particularly to means for transferring sealing pads from a source of supply to position in alinement with the feed of closure caps and inserting the transferred sealing pads in closure caps, and said means being adapted for use with the closure cap feeding or conveying means disclosed in the application of John C. Johnson, Serial No. 680,315, filed June 28, 1946, now Patent No. 2,484,095.

It is an object of the invention to provide sealing pad transferring and inserting means capable of supplying sealing pads to all the closure caps successively fed relative to said means.

It is another object of the invention to provide means to transfer sealing pads from a pair of stacks of sealing pads to position in alinement with a single row of closure caps and insert sealing pads transferred from alternate stacks into successive closure caps.

It is another object of the invention to provide means to register the transferred sealing pads in alinement with the path of feed of the closure caps.

It is a further object of the invention to support the sealing pads in stack formation independently of the means to transfer the sealing pads from the stacks to position in alinement with the path of feed of the closure caps.

It is a further object of the invention to provide a support for the closure cap receiving the sealing pad to prevent forcing of the closure caps from its feeding and supporting means.

Another object of the invention is to yieldingly support a closure cap relative to the means to insert a sealing pad therein whereby the closure cap is adjusted into alinement with the sealing pad inserting means by the movement of said inserting means into the closure cap to assure proper positioning of the sealing pad in the closure cap.

Another object of the invention is to operate the closure cap feeding means and the sealing pad transferring and inserting means from a drive shaft mounted at one side of the path of feed of the closure caps.

Other objects and advantages of the invention will be described hereinafter.

In the drawings accompanying and forming a part of this application, Figure 1 is a plan view of part of closure cap assembling apparatus having incorporated therein the embodiment of the invention.

Figure 2 is a cross sectional view, on an enlarged scale, taken on the line 2—2 of Figure 1 looking in the direction of the arrows to show means for transferring sealing pads from alternate stacks of sealing pads with the sealing pad inserting means partially omitted and also showing operative connections of a drive shaft with said sealing pad transferring and inserting means.

Figure 3 is a fragmentary elevational view of the means for inserting sealing pads in the closure caps looking in the direction of the arrows from the line 3—3 of Figure 1.

Figures 4 and 5 are sectional views, on an enlarged scale, taken on the line 4—5 of Figure 1 looking in the direction of the arrows, and showing in Figure 4 the sealing pad transferring means in operative condition to transfer sealing pads, and Figure 5 showing said means in inoperative condition caused by the absence of a closure cap relative to the sealing pad inserting means.

Figure 6 is a fragmentary plan view, on an enlarged scale, of the means for transferring and inserting sealing pads with part of the sealing pad inserting means broken away.

Figure 7 is a view similar to Figure 6 with a slide retaining plate and part of the control means for the sealing pad transferring means removed.

Figure 8 is a sectional view taken on the line 8—8 of Figure 6 looking in the direction of the arrows to show the structure of the means to transfer sealing pads and actuating means therefor.

Figure 9 is a fragmentary side elevational view, on an enlarged scale, looking at the bottom of Figure 1 and showing operative connections between the sealing pad transferring and inserting means and the drive shaft.

Figure 10 is a fragmentary sectional view taken on the line 10—10 of Figure 6 looking in the direction of the arrows to show means to support a closure cap relative to the means to insert a sealing pad therein.

Figure 12 is a fragmentary plan view of the discharge end of closure cap supporting means showing means to yieldingly retain a closure cap having a sealing pad therein relative to a pressure applying head or table.

Figure 13 is a side elevational view of the closure cap supporting means looking at the bottom of Figure 12.

Figure 14 is an end elevational view looking from the line 14—14 of Figure 12 in the direction of the arrows to show the means to yieldingly retain the closure cap.

Figure 15 is a sectional view taken on the line 15—15 of Figure 12 looking in the direction of the arrows to show abutments to register a transferred sealing pad in alinement with the inserting means and a closure cap, and a yielding support for said closure cap to facilitate alining of the closure cap with and by the inserting means.

Figure 11:
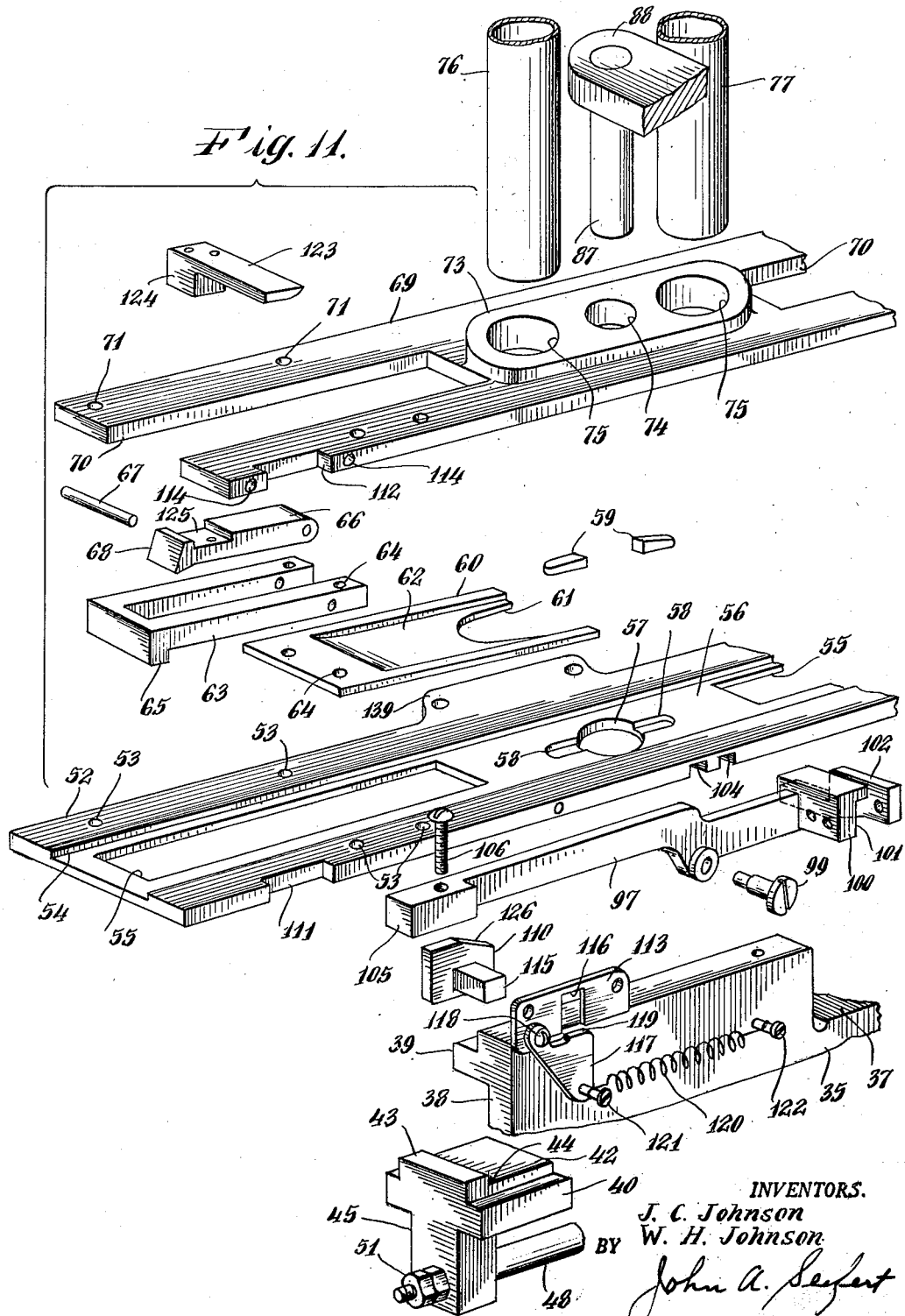
Figure 11 is a composite view in perspective showing the parts of the sealing pad transferring and inserting means at the left hand side of Figure 2 in disconnected position relative to each other.

The embodiment of the present invention is shown in the accompanying drawings as forming a part of apparatus for assembling closure caps comprising a table 16 supported at the opposite ends by legs 17 and a drive shaft 18 rotatably suspended below the table and extending at one side of the longitudinal axis of the table. The drive shaft is driven from a suitable source of power, not shown, in any conventional manner.

Closure caps C are slidably supported on the longitudinal axis of the table 16 by a pair of rails 19 supported in parallel spaced relation to each other and in spaced relation to the top of the table 16 by an arch shaped member 20 secured to the top of table 16 and by the supporting structure of the sealing pad transferring and inserting means to be described hereinafter. The opposed edges of the rails 19 are beveled to engage diametrically opposite sections of the flaring marginal portion of the closure caps and suspend the body of the closure caps between the rails with the bottom portion extending below the rails to be engaged by spaced fingers 21 of a pair of rack bars 22 slidably supported in the arch member 20 and a supporting base of the sealing pad transferring and inserting means to extend below the rails 19. The rack bars 22 are actuated in opposite circular directions to successively engage the fingers 21 with the bottom portions of the closure caps and feed the closure caps along the rails 19. One of the rack bars 22 is actuated by a pair of gears 23 rotatably supported by the table 16 and rotated in one direction by the drive shaft 18, as shown in application Serial No. 680,315, and pivotally connected to lateral extensions 24 at the opposite ends of said rack bar. The other rack bar is similarly connected to and actuated by a pair of gears 25 rotatably supported by the table 16 and meshing with and driven by the gears 23, as shown in Figure 1.

The closure caps are delivered to one end of the rails 19 to be engaged and fed along the rails by the rack bar fingers 21 by an endless conveyer belt 26 actuated by the drive shaft 18 through a belt 27 engaged around pulley wheels 28 fixed on the drive shaft 18 and a shaft 29 rotatably supported in arms 30 of a guide frame 31 for the conveyer 26. Rotation of the shaft 29 is transmitted to the conveyer 26 through beveled gear 32 fixed on a projecting end of the shaft 29 and meshing with a beveled gear 33 fixed on a shaft 34 of one of the conveyer supporting drums.

The closure caps C on the rails 19 are successively fed relative to a device, not shown, for depositing adhesive in said closure caps and subsequently through a heated zone to render the adhesive viscous. Closure caps having viscous adhesive therein are fed by the fingers 21 of the racks 22 relative to means for engaging sealing pads in said closure caps in contact with the viscous adhesive. Said means constitute the embodiment of the present invention and comprise a transverse member 35 mounted on top of the table 16 by bolts engaged in flanges of said member and the table, as at 36, and having a recess 37 in the center thereof for slidably supporting the rack bars 22, as shown in Figures 2 to 5, inclusive. Opposite end portions of the transverse member forming the side walls of the recess 37 are provided with a channel or recess 38 extending longitudinally into the opposite ends of said transverse member and shoulders 39 extending inwardly from the opposite side walls of said channel and spaced from each other to constitute slide rails for a pair of blocks 40 and 41 having the opposite marginal portions engaging the upper surface of the rails 39 and each block having a raised center portion 42 on the upper face and a transverse shoulder 43 at one end of said raised portion with the face of said shoulder adjacent to the raised portion extending inwardly to form a hook, as shown at 44 in Figures 4, 5 and 11, for a purpose to be hereinafter described. The block 40 is arranged with a depending portion 45 at the end arranged with the hooked shoulder 43 and having a perforation therethrough, and the corresponding end of the block 41 provided with a bifurcated depending portion 46 pivotally supporting a clevis 47 at the free end of the bifurcation. The blocks 40 and 41 are connected together by a rod 48 slidable in a bore 49 in the member 35 extending below the recess 37 and connecting the channels 38, and one end of the rod secured to the connecting portion of the clevis as by screw threading said end in a screw threaded opening in the clevis, as shown at 50 in Figures 4 and 5, and the opposite end of the rod adjustably connected to the depending portion 45 of block 40 by engaging a screw threaded reduced end portion of the rod in the perforation of the depending portion 45 and engaging lock nuts on said reduced end portion at opposite sides of the depending portion 45, as shown at 51 in Figures 4 and 5.

The blocks 40 and 41 are slidably retained on the rails 39 by a plate 52 secured at the longitudinal marginal portions to the upper edges of the side walls of the channels 38 by engaging screws through the openings 53 in the plate 52 and into the member 35, as will be more fully described hereinafter. The upper exposed face of the plate 52 is provided with a channel 54 extending from end to end of said plate and having a bottom wall arranged with two rectangular openings 55 spaced a slight distance from the ends of the plate and the inner ends of the openings spaced a greater distance from each other by a wall portion 56 having an opening 57 in the center thereof tapering in a downward direction, as shown in Figures 4, 5, 7, 11 and 15. The upper surface of the wall 56 at diametrically opposite portions of the opening 57 extending on the longitudinal axes of the openings 55 are recessed, as shown at 58 in Figure 11, for the mounting of abutment members 59 having the upper face declining from the end juxtaposed to the opening 57, as shown in Figure 15, for a purpose to be hereinafter described. The opening 57 is positioned in vertical alinement with the space between the rails 19 so that the closure caps are successively positioned below and in register with said opening. The raised portion 42 and hook shoulder 43 of the slide blocks 40, 41 extend in the openings 55 of the plate 52 and the reciprocal movements of said slide blocks are limited by said raised portion and hook shoulder engaging the opposite end walls of the openings. The openings 55 and the channels 38 are in axial alinement.

The channel 54 in the plate 52 forms a slideway for a pair of slides 60, each slide having a recess 61 extending into one end and having the closed end of arcuate shape corresponding to the radius of sealing pads P to be deposited or inserted in the closure caps. The upper face of each slide 60 is arranged with a rectangular groove 62 opening to the recessed end of the slide and terminating in spaced relation to the opposite end of the slide. The slides 60 are adapted to participate in the movement of the slide blocks 40, 41 from the opening 57 at all times and selectively participate in the movement of the slide blocks toward said opening. This is accomplished by coupling means comprising a U-shaped member 63 mounted at the free ends of the leg portions of the U on the flat upper face of the slides 60 at the end opposite the recess 61 as by screws engaged in alined openings 64 and having a lip portion 65 depending from the connecting portion of the U to engage the end face of the shoulder 43 of the blocks 40, 41 opposite the hook 44, whereby movement of the blocks 40, 41 in a direction from the opening 57 is imparted to the slides 60. A latch member 66 is pivotally mounted at one end between and on the leg portions of the U of the member 63 by a pin 67 engaged in alined openings in the leg portions and latch with the opposite end of wedge shape, as shown at 68 in Figure 11, to engage the hook 44 of the shoulder 43 and transmit to the slides the movement of the blocks 40, 41 toward the opening 57.

The slides 60 are slidably retained in the channel 54 relative to the openings 55 by a plate 69 having a rectangular recesses 70 extending into the opposite ends of the plate and corresponding to the openings 55 in the slideway plate 52 and the recess 38 in the transverse base member 35 and arranged with openings 71 along the marginal portions corresponding to the openings 53 in the slideway plate 52 for the engagement of screws 72 to secure together the transverse base member 35, slideway plate 52 and slide retaining plate 69. The upper face of the plate 69 between the recesses 70 is provided with a raised portion or boss 73 arranged with three openings extending through the plate and raised portion, the middle opening 74 being slightly smaller and in axial alinement with the opening 57 and the two end openings 75 being of greater diameter than the opening 74 and extending in vertical alinement with sections of the wall portion 56 between the openings 55 and opening 57.

Sealing pads P, shown in the present illustration of the invention as being comminuted cork disks, are supplied from a hopper or a pair of hoppers, not shown, to the path of movement of the slides 60 toward the opening 57 through a pair of delivery tubes 76, 77 connected at the upper end in communication with the outlet of the hopper or hoppers and the lower end portion engaged in the openings 75 so that the lowermost sealing pads in said tubes rest on the wall portion 56 on diametrically opposite sides of the opening 57 between the inner ends of the openings 55 and the tapered ends of the abutments 59.

The slides 60 are actuated to successively transfer the lowermost sealing pads alternately from the tubes 76, 77 to the opening 57 in engagement with an abutment 59 to register said pads with the opening 57. This is accomplished by connecting the slide blocks 40, 41 by the rod 48 and imparting reciprocatory movement to the slide block 41 from the drive shaft 18 through a lever 78 pivotally mounted in a bifurcated bracket 79 secured to the side of the table 16 in axial alinement with the transverse member 35. The upper end of the lever is operatively connected to the slide block 41 by a rod 80 pivotally connected at one end in the bifurcated depending portion 46 of the slide block 41 by a pin 81 engaged in alined openings in the bifurcation legs and a boss of the rod, and the opposite end of the rod 80 pivotally connected between and to a bifurcation 82 at the upper end of the lever 78. The lower end of the lever 78 is provided with a pivoted collar 83 for the adjustable mounting of one end portion of a rod 84 having the opposite end portion connected to a strap 85 encircling an eccentric disk 86 secured on the drive shaft 18, as shown in Figures 2 and 9. The movement of the bifurcated end 82 of the lever 78 toward the table 16 actuates slide 60 connected to the slide block 41 to transfer the lowermost sealing pad in tube 77 to the opening 57 in engagement with the abutment 59 nearest the tube 76, and the movement of said bifurcated end 82 from the table 16 actuates the slide 60 connected to block 40 to transfer the lowermost sealing pad in tube 76 to the opening 57 in engagement with the abutment 59 nearest the tube 77.

A sealing pad transferred from either tube 76 or 77 to the opening 57 is inserted in a closure cap positioned by the feeding rack fingers 21 in register with the opening 57 and the sealing pad engaged in said opening 57. Due to the tapering wall of the opening 57, the sealing pad is held therein until forcedly pushed therefrom by a plunger 87 having one end portion slidable in the opening 74 of the boss 73 and slide retaining plate 69 carried at the opposite end by an angle portion 88 of a right angle arm having the other angle portion 89 secured to the upper end of a slide rod 90. The slide rod 90 is slidable in a hollow column 91 having a flange 92 intermediate its ends to support the column in an opening in the table 16, as shown in Figures 6 and 9, and said column having a removable side wall 93 to facilitate mounting of the slide rod therein. The lower end of the slide rod 90 is provided with a roller 94 extending laterally therefrom to engage a cam groove 95 in the face of a disk 96 secured on the drive shaft 18. The plunger 87 is yieldingly urged from the opening 57 by a spring 107 having one end engaged in a cup member 108 mounted on a rail 19 and the opposite end of the spring engaged around a projection 109 extending from the bottom of the arm portion 89, as shown in Figures 3 and 9.

The gears 24, 25, eccentric disk 86 and the cam groove 95 are proportioned relative to each other, so that a sealing pad P is transferred from either of the tubes 76 or 77 to the opening 57 while a closure cap on the rails 19 is fed by the rack bars 22 toward said opening 57 and the plunger 87 is actuated from the opening 57, and simultaneously with the positioning of the sealing pad in the opening 57 and the closure cap below the opening 57 in alinement with the sealing pad therein, the plunger 87 is actuated toward the opening 57 to insert the sealing pad into the alined closure cap, and during the retrograde movement of the plunger 87, a sealing pad is transferred from the other tube toward the opening 57 and the successive closure cap on the rails 19 is fed toward the opening 57, and the inserting of said second sealing pad into the successive closure cap by plunger 87 is repeated.

Should there be no closure cap on the rails 19 in position to be fed by the fingers 21 of the rack bars 22 in register with a sealing pad to be transferred from the alternate tube 76 or 77, the transferring of said sealing pad is prevented by actuating the latch 66, of the slide 60 transferring said sealing pad, out of engagement with the hook 44 of the associated slide block 40 or 41. This is accomplished by providing a pair of levers 97, 98, each lever having the opposite end portions offset to extend in different horizontal planes and pivotally mounted at the offset portion to a side edge of the slideway plate 52 with each lever pivotally mounted at opposite sides of the opening 57, as shown in Figures 2 and 11, by a pivot pin 99 rotatably engaging an opening in the levers and screw threaded in the slideway plate 52. The lowermost end portion of each of the levers 97 and 98 is weighted by a portion 100 extending laterally from said end and having the face undercut, as at 101, for the mounting of a shoe having a body portion 102 engaged and secured in the undercut face 101 and a projection 103 extending from one end and in a horizontal plane below the bottom edge of the body, as shown in Figure 13. The shoe projections 103 extend into a pair of grooves 104 in the bottom face of the slideway plate 52 to engage a closure cap on the rails 19 approaching the opening 57, as shown in Figures 4 and 5. The uppermost end portion of each of the levers 97 and 98 is provided with an enlarged end having a screw threaded opening extending vertically therethrough, as shown at 105 in Figure 11, for the adjustable mounting of an abutment in the form of a screw 106. The shoe projection 103 of each lever 97 and 98 is yieldingly urged into the path of a closure cap by a slide 110 slidably retained in alined cutouts 111 and 112 in the edges of the slideway plate 52 and slide retaining plate 69 adjacent each end of said plates, respectively, by a plate 113 secured to the edge of the slide retaining plate 69, as indicated by the holes 114 in the plate 69. The slide 110 is provided with a projection 115 extending from the outer face thereof through a slot 116 in the plate 113 to engage the lower end of the abutment screw 106. The slide 110 is yieldingly urged to engage the projection 115 with the screw 106 by a triangular plate 117 pivotally mounted at an extended angle portion on the plate 113, as at 118, and having a flat edge face 119 at a second angle portion yieldingly urged to engage the bottom of the projection 115 by a spring 120 fixed at one end to the third angle portion of the plate 117 by a pin 121 and the opposite end of the spring connected to a pin 122 secured in and projecting from the transverse base member 35, as shown in Figures 2 and 11. The urging of the slide 110 in an upward direction by the spring 120 will also lift the latch 66 out of engagement with the hook 44 of the slide blocks 40, 41 by said slide 110 engaging an end portion of an arm 123 extending into the path of movement of the slide 110 and having a portion 124 of increased thickness on the underface at the opposite end engaged and secured in a cutout portion 125 in the latch 66, as shown in Figure 11.

Figure 4 shows the position of the levers 97, 98 when a closure cap is approaching a position in alinement below the opening 57 and engaging the shoe projections 103 and thereby lifting the weighted ends 100 of the levers 97, 98 and lowering the ends 105 and consequently the slide 110 against the forces of springs 120 which permit the latches 66 to engage the wedged edges 68 into engagement with the hooks 44 of the slide blocks 40, 41 by the weight of the latches and arms 123, and couple the slides 60 with the slide blocks 40, 41.

Figure 5 shows the position of the levers 97, 98 when there is no closure cap engaging the shoe projections 103 whereby the shoes 102 drop into the space between the rails 19 lifting the ends 105 by the weight of the ends 100 and the springs 120, and the lifting of the ends 105 permitting the slides 110 under the forces of the springs 120 to lift the latches 66 out of engagement with the slide blocks 40, 41, so that no forward movement is imparted to the slide 60 associated with the slide block 40 and therefore no sealing pad is transferred from tube 76 and engaged in the opening 57 and discharged from said opening into the space between the rails 19 by the plunger 87. The slide 60 associated with the slide block 41 is shown at the terminus of its sealing pad transferring movement, so that the latch 66 has not been actuated to uncoupling position but will be actuated to said position if no closure cap is engaging the shoe projections 103 when the slide 60 and its associated slide block 41 reach the terminus of their retrograde movement from the opening 57 and the arm 123 of the latch 66 of said slide 60 is engaged by the raised slide 110. The forward upper portion of the slide 110 is beveled at 126 to facilitate such an engagement between the latch arm 123 and the slide 110, as shown in Figure 5.

To prevent the forcing of the closure cap from the rails 19 during the positioning of the sealing pad P therein by the plunger 87, a support for said closure cap is provided in the form of a block 127 having opposite flange portions at one end secured to the bottom wall of the recess 37 in the base member 35 by screws 128 engaged in said flange portions, as shown in Figures 2, 4, 5 and 10, in vertical alinement with the opening 57 with the top of the block below the closure cap engaging fingers 21 and the path of travel of the bottom of the closure caps so as to not interfere with the travel or feed of the closure caps but to engage the bottom of the closure cap when pressure is applied thereto by the plunger 87 to prevent the closure cap from being forced from the fingers 21 and the rails 19.

The closure cap positioned relative to the opening 57 is permitted to be alined with said opening by the downward movement of the plunger 87 and the sealing pad carried thereby by being yieldingly supported. This is accomplished by removing the marginal portions of one of the closure cap supporting rails 19, as at 129 in Figure 12, to form a narrow connecting portion 130 in said rail, so that the closure cap below the opening 57 is supported only at one marginal portion by a fixed rail 19. The opposite marginal portion of the closure cap is supported by a yielding support in the form of a bar 131 having a beveled edge 132 to engage said opposite marginal portion of the closure cap and an undercut portion 133 extending from side to side to slidably mount said bar on the narrow connecting portion 130 of the rail 29, the width of the undercut portion 133 being greater than the width of the portion 130. The bottom face of the wall portion 56 of the slideway plate 52 is recessed, as shown at 134 in Figure 15, to accommodate the sliding mounting of the bar 131 on the rail portion 130. The beveled edge 132 is yieldingly positioned to engage the opposite marginal portion of the closure cap by springs 135 engaged on rods 136 secured at one end in the edge of the bar 131 opposite the edge 132 and the opposite end portions of the rods 136 slidable in a transverse member 137 secured at the end portions to the bottom face of the wall portion 56 on opposite sides of the recess 134 therein. The springs 135 are compressed between the opposite edge of the bar 131 and the transverse member 137 with the ends of the springs abutting the transverse member seated in recesses 138 in said member. The springs 135 permit the bar 131 to be moved from the opposed rail 19 when a closure cap is engaged by the fingers 21 between the rail 19 and bar 131 and movement of the closure cap in a horizontal direction by the sealing pad inserting movement of the plunger 87 should the closure cap be out of alinement with said movement.

The slideway plate 52 has a lateral extension 139 midway the ends to support the rails 19 by screws as shown at 140 in Figure 13.

After the sealing pads are inserted in the closure caps, said closure caps are successively moved along the rails 19 by the fingers 21 of the rack bars 22 from the sealing pad assembling means to a revolving table, indicated in a general way at 141, carrying a series of spring influenced plungers slidably mounted to have movement toward and away from a closure cap supporting shelf on the table and a cam adapted to actuate the plungers from said shelf against the springs while said shelf is traveling past the delivery end of the rails 19 and the springs moving the plungers into engagement with the sealing pads in the closure caps on the shelf of the table to apply pressure to the sealing pads during the cooling of the adhesive in the closure caps to assure adhesion between the sealing pads and closure caps. The structure of this pressure applying table is not shown nor described in detail as it is well known in the art. The pressure applying table is rotated from the drive shaft 18 in any suitable manner.

During the travel of closure caps from the sealing pad applying means to the pressure applying table, the closure caps are retained on the rails 19 by guide rails 142 and 143, as shown in Figures 9, 12, 13 and 14, secured to the closure cap supporting rails with a marginal portion extending over the opposite marginal portions of the closure caps supported by the rails 19. The rail 142 has an end portion extending beyond its associated rail 19 and over the closure cap supporting shelf of the table 141, and said extending end having the inner guide edge extending slightly inwardly toward the path of travel of the closure caps, as shown at 144 in Figure 12. The rail 19 is extended with the extended end portion 144 in the form of a plate 145 riveted to the underface of the extended end portion 144 and having a beveled edge 146 extending from the beveled edge of the rail 19 at a sharper angle than the inner edge 144 to guide the closure caps at an obtuse angle to the path of travel of the closure caps along the table 16. The other guide rail 143 has a pointed extension 147 extending along the beveled edge of its associated rail 19. The closure caps are yieldingly urged against the beveled edge 146 of the plate 145 by a finger 148 pivotally mounted on the guide rail 142, as at 149, and having an extension 150 projecting beyond the outer edge of the rail 142 and connected to one end of a spring 151 secured at the opposite end to the associated rail 19, as at 152. The opposite free end of the finger 148 is arranged with a curved recess 153 in the forward edge thereof yieldingly urged by the spring 151 toward a closure cap and adjacent to the free end thereof. The free end of the finger is arranged with a shoe 154 secured to the underface of the finger to extend transversely of said end and the end of the shoe adjacent to the curved recess 153 terminating within the edge of said recess and arranged with an inwardly extending cutout portion having a beveled face 155 extending at an angle of 45° to the horizontal to engage the flaring edge of the marginal portion of the closure cap and support the closure cap in conjunction with the beveled edge 146. The movement of the finger 148 from the edges 144, 146 is limited by the shoe 154 abutting the angle edge of the pointed portion 147 of the rail 143, and the movement of the finger toward the edges 144, 146 is limited by a stop pin 156 fixed in and projecting from the guide rail 142 to engage the rearward edge of the finger.

The finger 148 retains the closure cap against the edge 146 until said closure cap is removed therefrom by the rotation of the pressure applying table 141.

Having thus described our invention, we claim:

1. In means to feed sealing pads to closure caps being conveyed in a single row, a pair of means for supporting a stack of sealing pads on opposite sides of the path of travel of closure caps, a slide associated with each stack of sealing pads and actuated to transfer a sealing pad alternately from the opposed stacks to a position above the path of travel of closure caps, and single means to engage the sealing pads successively positioned above the path of travel of closure caps into the successive closure caps.

2. In means to feed sealing pads to closure caps being conveyed in a single row, a pair of means to support a stack of sealing pads on opposite sides of the path of travel of closure caps, a slide movable relative to each stack of sealing pads to engage the lowermost sealing pad in said stack and position said sealing pad above the path of travel of closure caps and in line with a closure cap being conveyed, means to simultaneously reciprocate the slides in the same direction to successively engage and position a sealing pad from alternate stacks relative to successive closure caps, and a plunger reciprocating relative to a sealing pad positioned by one of the slides above the path of travel of closure caps to engage said sealing pad into an alined closure cap.

3. In means to feed sealing pads to closure caps being conveyed in a single row as claimed in claim 2, a slideway for the slides having a transverse wall below each stack of sealing pads to support the lowermost sealing pad in each stack in the path of pad positioning movement of the slides.

4. In means to feed sealing pads to closure caps being conveyed in a single row as claimed in claim 2, a support mounted below the path of travel of closure caps and in axial alinement with the plunger to engage the bottom of the closure cap receiving a sealing pad from the plunger.

5. In means to feed sealing pads to closure caps being conveyed in a single row as claimed in claim 2, a slideway for the slides having a transverse wall intermediate the ends thereof to support the lowermost sealing pad in each stack of sealing pads arranged with an opening between the sealing pad supporting portions and in axial alinement with the plunger, and abutments at diametrical opposite portions of the opening in the path of the pad positioning movement of the slides to engage the leading edge of a sealing pad being moved by a slide and register said sealing pad in the opening.

6. Means to feed sealing pads to closure caps being conveyed in a single row as claimed in claim 2, wherein the means to simultaneously reciprocate the slides in the same direction comprises a pair of members connected to each other and each member slidably mounted relative to a slide and arranged to engage and move said slide in the retrograde movement of the member from a stack of sealing pads, a latch pivoted on each slide and adapted to engage the associated member to impart movement of said member toward the stack of sealing pads to the slide to move a sealing pad in register with the plunger, and a power driven lever connected to one of the members to simultaneously reciprocate the members in the same direction.

7. In means to feed sealing pads to closure caps being conveyed in a single row, a pair of means for supporting a stack of sealing pads on opposite sides of the path of travel of closure caps, means to engage a sealing pad in a closure cap, a pair of slides, each slide slidable transversely of a stack of sealing pads and having one end arranged to engage the lowermost sealing pad in the associated stack and the opposite end portion having an elongated opening therein and a depending lip at said end, a pair of connected members, each member slidable below a slide and having a projection to engage the depending lip of the associated slide and transmit retrograde movement of said member from the stacks of sealing pads to the associated slide, a latch pivotally mounted in the opening of each slide to engage the projection of the associated member and transmit movement of said member toward the stacks of sealing pads to the associated slide to engage said slide with the lowermost sealing pad in the associated stack and position said sealing pad relative to the means to engage a sealing pad in a closure cap, means connected to one of the connected members to simultaneously reciprocate the members in the same direction and successively position sealing pads from alternate stacks relative to the means to engage a sealing pad in a closure cap, a lever pivotally mounted relative to each slide and having one end operatively connected to the latch of said slide and the opposite end weighted and having a portion extending in the path of travel of closure caps to engage a closure cap approaching the means to engage a sealing pad in said closure cap, and the absence of a closure cap causing the levers to actuate the latches out of engagement with the projections of the connected members and prevent actuation of the slides to move a sealing pad from the associated stack of sealing pads to the means to engage a sealing pad in a closure cap.

8. In means to feed sealing pads to closure caps being conveyed in a single row, a table, a pair of means supported by the table to support a stack of sealing pads on opposite sides of the path of travel of closure caps, slides supported by the table to successively position the sealing pads from alternate stacks in alinement with the path of feed of closure caps, means supported by the table to engage a positioned sealing pad in an alined closure cap, a drive shaft supported by the table to extend at one side of the longitudinal center of the table, the slides and means to engage positioned sealing pads in alined closure caps being operatively connected to the drive shaft and actuated in synchronism with each other by the rotation of the drive shaft.

9. Means to feed sealing pads to closure caps being conveyed in a single row as claimed in claim 8, wherein the means to engage positioned sealing pads in alined closure caps comprises a plunger, a slide mounted in vertical alinement with the drive shaft and having a roller at one end, an angular arm having one angle portion secured to the opposite end of the slide and the other angle portion extending above the path of travel of closure caps and carrying the plunger, and a disk secured on the drive shaft and arranged with a cam groove in a face thereof for the engagement of the slide roller to reciprocate the slide and plunger.

10. Means to feed sealing pads to closure caps being conveyed in a single row as claimed in claim 8, wherein the slides to position sealing pads from alternate stacks in alinement with the path of travel of closure caps are operatively connected to the drive shaft through a lever pivotally supported by the table and having one end operatively connected to said slides, and an eccentric disk secured to the drive shaft and having a strap encircling said eccentric disk and connected to the opposite end of the lever.

JOHN C. JOHNSON.
WALTER H. JOHNSON.

REFERENCES CITED

The following references are of record in the file of this patent:

UNITED STATES PATENTS

| Number | Name | Date |
|---|---|---|
| 1,134,031 | Clark | Mar. 30, 1915 |